INVENTORS,
Joe A. Swisher
Arthur D. Coates

United States Patent Office 3,475,607
Patented Oct. 28, 1969

3,475,607
METHOD FOR MEASURING DOSES OF IONIZING RADIATIONS
Joe A. Swisher and Arthur D. Coates, Aberdeen, Md., assignors to the United States of America as represented by the Secretary of the Army
Filed July 27, 1966, Ser. No. 568,363
Int. Cl. G01t 1/16
U.S. Cl. 250—83.3      2 Claims

ABSTRACT OF THE DISCLOSURE

A method for measuring doses of ionizing radiations comprising irradiating an olefin-type polymer material with gamma radiation in the presence of air. The oxidized material is then irradiated with neutrons thereby forming nitrogen-16. The formed nitrogen-16 rapidly decays to form oxygen-16 concurrently emitting high energy gamma and beta radiations. The emitted radiation is measured utilizing electronic means.

---

The invention described herein may be manufactured and used by or for the Government, for governmental purposes, without the payment to us of any royalty thereon.

The present invention relates to a method for measuring gamma radiation by neutron activation.

A need for high level dosimetry has arisen with the advent of large irradiation devices which emit gamma doses in excess of $1 \times 10^6$ rads per hour. Ionizing radiation causes chemical reaction in most materials. The magnitude of these reactions—i.e., the change promoted in the subject material—can be correlated to the radiation dose. Therefore, the principal requirement for successful correlation, is a subject material which displays unequivocal change that can be easily measured and related to dosage.

Polyethylene, and other polymers of the olefin type, are highly stable, solid and nontoxic. They also have the advantageous property of malleability. In particular, polyethylene is a long-chain organic molecule embodying carbon and hydrogen atoms in a stoichiometric combination; with a basic structure of $(-CH_2-CH_2-)_n$, $n$ being a large number. Additionally, polyethylene is sensitive to and characteristically reacts to a specific type, energy and dose of radiation.

Gamma radiation exposure, in the presence of air, causes sundry chemical reactions in polyethylene including, cross-linking, main and side chain cleavage, hydrogen evolution, unsaturation and oxidation. The subject invention addresses itself to the latter, for the increase of oxygen in the polyethylene sample is proportionally related to gamma ray dosage. Upon irradiation, oxygen from the air combines with the elements comprising polyethylene to form hydroxyl (—OH) and carbonyl (C=O) groups. Fortunately, other reactions occurring simultaneously do not interfere with subsequent oxidation measurement.

The prior art teaches primarily two methods of radiation measurement in an exposed sample—by physical and by spectrophotometric manifestation. Both techniques prove inadequate when reaction products undergo small change or when there exists very small or very large concentrations of reaction products. The instant invention avoids difficulties inherent in earlier procedures.

Briefly, the process of the invention is as follows. The polymer, oxidized by gamma ray exposure, is irradiated a second time; now, with neutrons. Neutrons react with the oxygen in the polyethylene to form highly unstable nitrogen-16. Nitrogen-16 quickly decays to oxygen-16, emitting in the process high energy gamma and beta radiation. Next, and finally, the treated polyethylene is rapidly removed to an electronic instrument to measure the emitted radiation. To calibrate the process, known initial gamma doses are plotted against final emitted radiation for a polyethylene sample of given thickness and density.

The primary object of the present invention is to provide a method for measuring large doses of ionizing radiation.

Another object is to provide a dosimetry method requiring no lengthy analytical procedures and no highly purified compounds.

Another object is to provide a dosimetry method permitting variations in the radiation absorbing material to suit existing conditions.

Another object is to provide a dosimetry method permitting dose determinations in less than five minutes; analysis at a given time and verification, if desired, at a later date; and relatively simple data resolution through the utilization of predetermined calibration curves.

Finally, it is an object of the present invention to provide a dosimetry method of increased accuracy and of extended dose range.

These and other objects and advantages of the present invention will be fully apparent from the following description taken in connection with the drawing, in which.

Figure 1:
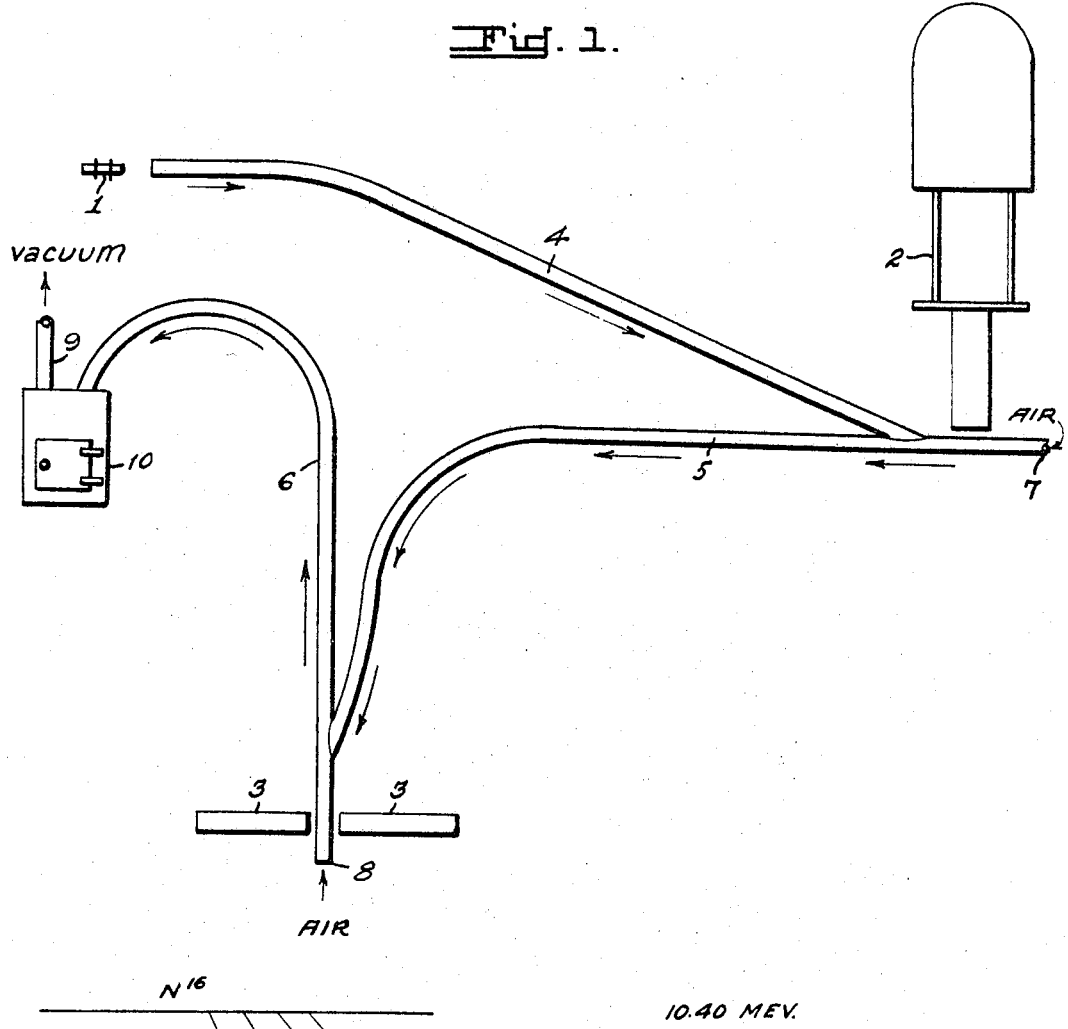
FIGURE 1 is a diagrammatic view indicating the steps of the present invention.

The polyethylene sample 1 utilized was of low density (0.915 and 0.925 gm./cm.$^3$) and of uniform $2.0 \pm 0.2$ mils thickness. It was irradiated by cobalt-60 gamma rays in the presence of air. Doses ranged from $1 \times 10^5$ to $4.7 \times 10^7$ rads. So exposed and oxidated the sample 1 was rolled as a tight concentric unit and placed in a standard activation sample container. The sample, or "rabbit" as it is commonly called, was next transferred to the neutron generator 2 by suction means in a ½ inch diameter polyethylene tube 4. The semi-vacuum within the tube forced the rabbit to its destination at neutron generator 2 where it was irradiated again, this time with neutrons for a period of about ten seconds. The threshold energy necessary for neutron induced activation of the oxygen (oxygen-16, which exists in 99.76% abundance in oxygen) was 9.6 million electron volts. It was convenient and reasonably inexpensive to obtain 14.3 mev. neutrons with a Cockcroft-Walton type accelerator 2. Such an accelerator utilized 150 kev. deutrons, which were accelerated onto a tritium target by a beam current of 500 microamps, thereby producing neutrons according to the following equation:

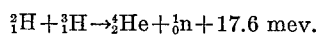

When the sample was exposed to those neutrons, the radiation-induced oxygen-16 content attributable to the absorbed gamma radiation was converted to nitrogen-16:

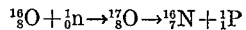

Nitrogen-16 had a half-life of 7.4 seconds so that it quickly decayed to stable oxygen-16 and emitted a quantity of radiation:

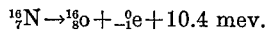

Figure 2:
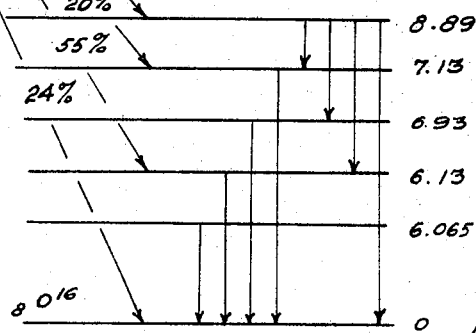
FIGURE 2 is a graph showing the disintegration scheme of nitrogen-16.

The decay gradation is depicted in FIGURE 2. The radiation emitted was beta and gamma radiation which was measurable and was proportional to the concentration of the oxygen produced by the initial exposure of the sample to gamma radiation. From the neutron generator 2 the rabbit is forced by a vacuum-atmosphere pressure differential from the end of 7 of tube 5, in three seconds to a scintillation spectrometer 3 which measured the final radiation. Counts from the sample were accumulated for thirty seconds—approximately four half-lives of nitrogen-16. After the radiation detection, the rabbit was transferred by means of tube 6, and a boost of air from the end 8 of tube 6, to a recovery chamber 10. The recovery chamber 10 was substantially evacuated through hose 9 and thereby provided the semi-vacuum for the entire system.

Figure 3:
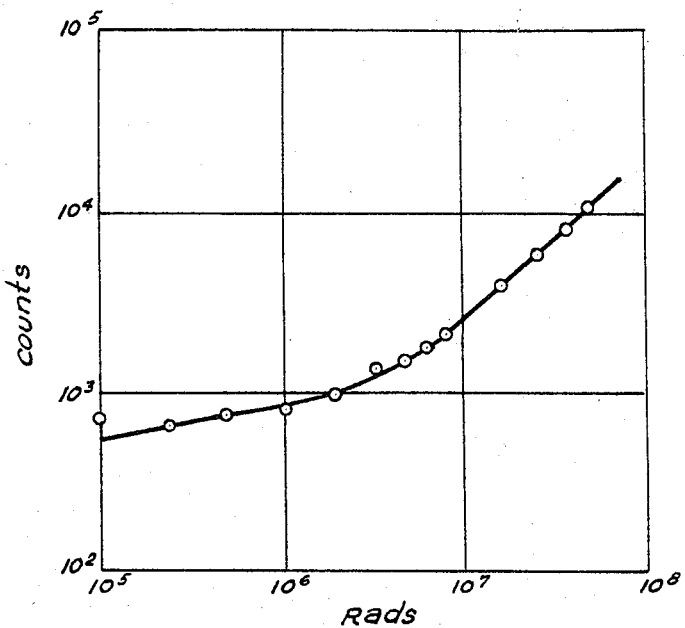
FIGURE 3 is a typical calibration graph showing the relationship between final radiation and initial dose.
Figure 4:
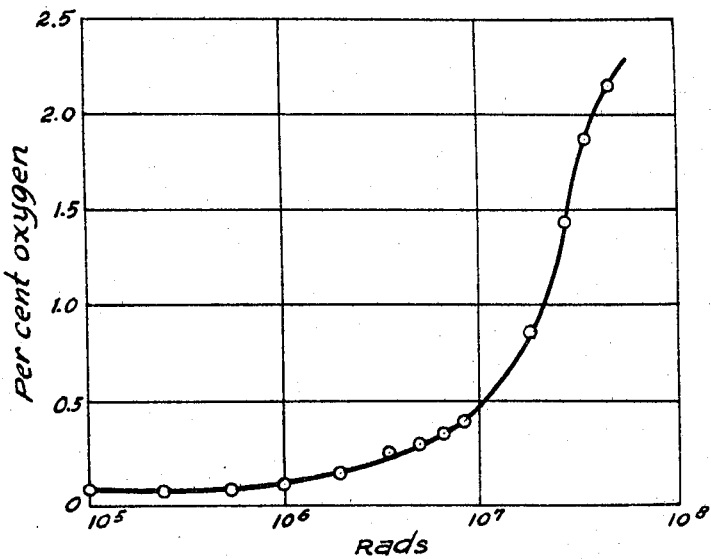
FIGURE 4 is a graph showing the percent of oxygen present in a sample versus the gamma dose causing that oxidation.

After each of such runs, normalized activity data obtained from the polymer sample is plotted against the known gamma dose with which the polymer film was initially treated in the high intensity gamma irradiation unit. FIGURE 3 depicts normalized counts versus gamma dose while FIGURE 4 translates counts into percent oxygen. In such a manner the method affords calibration for different polyethylene films. Each lot and type of low density polyethylene requires separate calibration. After calibration the method may be practiced using polymer films from the same lot and type on radiation of unknown magnitudes.

While only a preferred form of the invention is shown and described, other forms of the invention are contemplated and numerous changes and modifications may be made therein without departing from the spirit of the invention as set forth in the appended claims.

What is claimed is:

1. A method for measuring gamma rays, comprising the steps of selecting an olefin-type polymer sample material, calibrating a portion of said material to establish a mathematical relationship between known gamma ray doses to said material and consequent radiation emitted by said material, exposing said calibrated material to an unknown quantity of gamma radiation, rolling said polymer sample material into a tight concentric unit and placing said unit into a standard activation sample container, transferring said prepared material to a neutron generator; irradiating said material with neutrons to form unstable nitrogen-16, selecting a suitable radiation detector, transferring said material to said detector, measuring the quantity of radiation emitted by said material as the nitrogen-16 disintegrates to oxygen-16, and comparing said measured quantity of radiation with said established relationship to determine said initial gamma radiation.

2. The method set forth in claim 1, wherein said sample material consists of a polyethylene film of constant thickness and of low density.

References Cited
UNITED STATES PATENTS

| | | | |
|---|---|---|---|
| 2,206,634 | 7/1940 | Fermi et al. | 250—83.1 X |
| 2,957,080 | 10/1960 | Schulte et al. | |
| 2,937,279 | 5/1960 | Artandi. | |
| 3,087,880 | 4/1963 | Kollsman. | |
| 3,099,613 | 7/1963 | Bartok et al. | |
| 3,168,456 | 2/1965 | Furrow | 204—154 |
| 3,234,387 | 2/1966 | Verbinski | 250—83.3 |
| 3,254,210 | 5/1966 | Schmitt | 250—43.5 |

RALPH G. NILSON, Primary Examiner

MORTON J. FROME, Assistant Examiner

U.S. Cl. X.R.

204—162; 250—83, 43.5, 106